(12) United States Patent
Schönbrod et al.

(10) Patent No.: US 12,671,473 B2
(45) Date of Patent: Jun. 30, 2026

(54) METHODS, DEVICES, AND SYSTEMS FOR BLIND ADAPTIVE BEAMFORMING OF NARROWBAND SIGNALS WITH AN UNCALIBRATED ANTENNA ARRAY USING MACHINE LEARNING

(71) Applicant: JuliaHub, Inc., Boston, MA (US)

(72) Inventors: Sören Schönbrod, Aachen (DE); Elliot Saba, Seattle, WA (US)

(73) Assignee: JuliaHub, Inc., Boston, MA (US)

( * ) Notice: Subject to any disclaimer, the term of this patent is extended or adjusted under 35 U.S.C. 154(b) by 360 days.

(21) Appl. No.: 18/451,499

(22) Filed: Aug. 17, 2023

(65) Prior Publication Data
US 2024/0063866 A1 Feb. 22, 2024

Related U.S. Application Data

(60) Provisional application No. 63/371,691, filed on Aug. 17, 2022.

(51) Int. Cl.
| | |
|---|---|
| *H04B 7/00* | (2006.01) |
| *G06N 3/08* | (2023.01) |
| *H04B 7/06* | (2006.01) |
| *H04L 27/36* | (2006.01) |

(52) U.S. Cl.
CPC ............. *H04B 7/0617* (2013.01); *G06N 3/08* (2013.01); *H04L 27/36* (2013.01)

(58) Field of Classification Search
CPC ........ H04B 7/0617; G06N 3/08; G06N 3/045; H04L 27/36
See application file for complete search history.

(56) References Cited

U.S. PATENT DOCUMENTS

| | | | | |
|---|---|---|---|---|
| 11,075,786 | B1 * | 7/2021 | Shattil | H04B 7/024 |
| 2020/0343985 | A1 * | 10/2020 | O'Shea | G06N 20/00 |
| 2021/0112425 | A1 * | 4/2021 | Tran | H04B 7/0695 |
| 2023/0103220 | A1 * | 3/2023 | Pezeshki | H04B 7/08 370/329 |
| 2023/0261709 | A1 * | 8/2023 | Raghavan | H04B 7/06952 370/329 |

OTHER PUBLICATIONS

Marketsandmarkets, "Wireless connectivity market by connectivity technology (Wi-Fi, Bluetooth Classic, Bluetooth 4X, Bluetooth 5X, ZigBee, Z-Wave, UWB, NFC, Thread, GNSS, Cellular, EnOcean, Sigfox, LoRa, LTE Cat-M1, NB-IoT), End-use and Region—Global Forecast to 2027," MarketsAnd-Markets, Wireless Connectivity Market Report, Accessed Dec. 21, 2023, https://www.marketsandmarkets.com/Market-Reports/wireless-connectivity-market-192605963.html.

(Continued)

*Primary Examiner* — Ping Y Hsieh
(74) *Attorney, Agent, or Firm* — NK Patent Law

(57) ABSTRACT

Disclosed herein are systems and methods for blind adaptive beamforming narrowband signals with an uncalibrated antenna array using machine learning. A machine-learning model in the spatial domain enhances the signal of interest and mitigates interfering signals. The systems and methods described herein do not require a calibrated antenna array RF chain. They are based on a neural network that learns the structure of the signal of interest and separates it from other signals in the time, frequency, and spatial domains, without the need of any additional information.

21 Claims, 15 Drawing Sheets

(56)           References Cited

OTHER PUBLICATIONS

S. Pullen and G. X. Gao, "GNSS jamming in the name of privacy: Potential threat to GPS aviation," in InsideGNSS, Apr. 2012.

M. Souden, J. Benesty, and S. Affes, "A study of the LCMV and MVDR noise reduction filters," IEEE Transactions on Signal Processing, vol. 58, No. 9, pp. 4925-4935, Sep. 2010.

A. Weiss and B. Friedlander, ""Almost blind" steering vector estimation using second-order moments," IEEE Transactions on Signal Processing, vol. 44, No. 4, pp. 1024-1027, Apr. 1996.

R. Schmid, M. Rothacher, D. Thaller, and P. Steigenberger, "Absolute phase center corrections of satellite and receiver antennas," GPS Solutions, vol. 9, No. 4, pp. 283-293, Nov. 2005. [Online]. Available: https://doi.org/10.1007/s10291-005-0134-x.

M. Innes, E. Saba, K. Fischer, D. Gandhi, M. C. Rudilosso, N. M. Joy, T. Karmali, A. Pal, and V. Shah, "Fashionable modelling with flux," CoRR, vol. abs/1811.01457, Nov. 2018. [Online]. Available: https://arxiv.org/abs/1811.01457.

L. Pfeifenberger, M. Zöhrer, and F. Pernkopf, "Deep complex-valued neural beamformers," in ICASSP 2019—2019 IEEE International Conference on Acoustics, Speech and Signal Processing (ICASSP), May 2019, pp. 2902-2906.

D. P. Kingma and J. Ba, "Adam: A method for stochastic optimization," 2014. [Online]. Available: https://arxiv.org/abs/1412.6980.

* cited by examiner $$\mathrm{Re}\left\{\tanh(|x|)\frac{x}{|x|}\right\}$$

400A

Real

Imaginary

500

TRAIN A MACHINE-LEARNING MODEL USING SIMULATED SIGNALS FOR A PARTICULAR SIGNAL OF INTEREST AND M ANTENNA ELEMENTS 502

DEPLOY THE TRAINED MODEL AT AN M-ELEMENT ANTENNA ARRAY 504

RECEIVE INCOMING SIGNALS AT THE M-ELEMENT ANTENNA ARRAY 506

ESTIMATE A BEAMFORMER USING THE TRAINED MODEL 508

PERFORM BEAMFORMING ON THE INCOMING SIGNALS USING THE ESTIMATED BEAMFORMER 510

600B

METHODS, DEVICES, AND SYSTEMS FOR BLIND ADAPTIVE BEAMFORMING OF NARROWBAND SIGNALS WITH AN UNCALIBRATED ANTENNA ARRAY USING MACHINE LEARNING

CROSS-REFERENCE TO RELATED APPLICATIONS

This application claims priority to U.S. Provisional Patent Application Ser. No. 63/371,691, filed Aug. 17, 2022, titled "BLIND ADAPTIVE BEAMFORMING OF NARROW-BAND SIGNALS WITH AN UNCALIBRATED ANTENNA ARRAY USING MACHINE LEARNING", the disclosure of which is incorporated herein by reference in its entirety.

GOVERNMENT SUPPORT

This invention was made with Government support under Agreement No. HR00112190101, awarded by DARPA. The Government has certain rights in the invention.

TECHNICAL FIELD

The field of the invention relates generally to methods and systems for blind adaptive beamforming. More specifically, the field of the invention relates to methods and systems for beamforming of narrowband signals with an uncalibrated antenna array using machine learning.

BACKGROUND

Wireless communications have become the de facto standard for most consumer communication and networking systems. The diversity of wireless communication systems has increased with applications such as smart home, wearables, and various automation systems increasing in ubiquity. However, the frequency spectrum for wireless transmission is a limited resource. Usually, frequency ranges are allocated by government regulatory agencies. As a result, regional regulatory differences and other limitations have caused overlap between frequency band allocations. One well-known example is the 2.4 GHz band, where systems like Wi-Fi, Bluetooth, ZigBee and multiple audio-visual (AV) devices coexist. These circumstances lead to difficulties in error-free transmission, particularly in crowded locations.

In addition, software-defined radios (SDRs) and other technological developments are making wireless transmission more accessible to hobbyists and other non-specialist actors. For example, so-called personal privacy devices (PPDs) have recently become a problem for Global Navigation Satellite System (GNSS) users. PPDs are low-cost jammers used to mask GNSS signals to prevent location tracking by third parties. Illicit use of such PPDs can interfere with the use of location information in law enforcement and emergency situations. Additionally, unintentional jammers, such as microwave ovens, can cause high-power interference in already crowded frequency bands, such as the popular 2.4 GHz band.

Most conventional wireless communication systems utilize only the time and frequency domains for signal transmission. The spatial domain (i.e., utilizing multiple, spatially separated antenna elements), however, adds an extra degree of freedom that may be used to overcome the limitations of these traditional systems. Historically, the spatial domain has rarely been used for signal transmission, due to the high cost involved or the inflexible direction of the beam towards the receiver or transmitter. But as signal processing has shifted from hardware to software and the cost of multiple antennas has decreased, spatial signal processing has become more accessible. The use of antenna arrays allows adaptive change in the direction of the signal beam.

Adaptive signal beamforming is achieved by shifting the signals from each antenna element in such a way that the "signal of interest" sums constructively and interfering signals sum destructively. If the narrowband assumption holds, these shifts can be performed by phase shifts. There are multiple methods available to calculate these phase shifts. Currently, the two most prominent methods of calculating phase shifts use a minimum variance distortionless response (MVDR) beamformer or a linearly constrained minimum variance (LCMV) beamformer. Both methods require information about the relative phase of the impinging interferer at each antenna element. In theory, this is a deterministic calculation by the direction of arrival (DOA) and the displacement of the antenna elements, or it can be calculated by the eigen decomposition of the covariance matrix. However, the deterministic calculation requires the DOA of the interfering signal, which might be unknown, and the eigen decomposition requires information about the power of the interfering signal with respect to the signal of interest. The deterministic calculation also requires a calibrated multiantenna RF chain. There are essentially two types of gain and phase mismatches between the antenna channels that need to be compensated for, if the phase shifts are calculated based on the DOA:

(1) Gain and phase mismatches that are introduced by the different reception/transmission characteristics of each antenna element.

(2) Gain and phase mismatches that are introduced by the RF chain, like down-converters, amplifiers, various filters, unequal cable lengths, etc.

Mismatches between antenna channels occur due to varying manufacturing tolerances, vibrations, or temperature. The former is dependent on the DOA, but known to be quite stable over time and can, therefore, be measured in an anechoic chamber and saved for later processing. The latter, however, changes over time and, therefore, needs to be calibrated during run time.

Accordingly, there is a need for a beamformer that does not require expensive hardware to set up, and that can operate on any multi-antenna array without having to calibrate the multi-antenna array.

SUMMARY

Disclosed herein are methods, devices, and systems for blind adaptive beamforming to enhance the signal-to-interference-and-noise ratio (SINR) of the signal of interest using a machine-learning model. Compared to known beamformers (e.g., MVDR beamformers, LCMV beamformers, and Eigen beamformers), the systems and methods for beamforming described herein do not require side information to perform beamforming. Only the measurement itself is needed. With the system and methods disclosed herein, there is no threshold needed to indicate if the interference is present or not.

As described in more detail below, the systems and methods for beamforming described herein use a machine-learning model in the spatial domain designed to enhance the signal of interest and mitigate interfering signals. A calibrated antenna array RF chain is not required, thereby allowing for beamforming to be implemented quickly and efficiently using off-the-shelf antenna array hardware without having to set up and calibrate the antenna array. The beamformer described herein is based on a neural network that learns the structure of the signal of interest and separates it from other signals in the time, frequency, and spatial domains. This is done without the need of any additional information and can be used as a ballast to increase the signal-to-interference-and-noise ratio (SINR).

In contrast to well-known beamformers, such as LCMV beamformers and MVDR beamformers, the beamformer described herein does not require a calibrated RF front-end. Additionally, the beamformer described herein does not require information about the DOA of the signal of interest. Compared to an Eigen beamformer, which also does not need a calibrated RF front-end or information about the DOA, the beamformer described herein is able to separate signal of interest and interference. In contrast, an Eigen beamformer only enhances signals that have a power above a predefined threshold.

As shown below, the systems and methods for beamforming described herein achieve the maximal gain in terms of the SINR for low-powered jammers (i.e., <5 decibel (dB) jammer-to-noise ratio (JNR)).

The systems and methods described herein use a machine-learning-based approach that enhances the signal of interest and mitigates interfering signals without the need for calibration. In an embodiment of the systems and methods of beamforming described herein, a neural network is trained to find the signal of interest based on its structure. Other signals are mitigated spatially. In one embodiment, the implementation and evaluation are performed using the Julia programming language and the Flux machine learning framework, which is described in M. Innes, E. Saba, K. Fischer, D. Gandhi, M. C. Rudilosso, N. M. Joy, T. Karmali, A. Pal, and V. Shah, "Fashionable modelling with flux," CoRR, vol. abs/1811.01457, 2018, available at https://arxiv.org/abs/1811.01457, the entire contents of which is incorporated by reference herein in its entirety. Both the Julia programming language and the Flux machine-learning framework provide a fast computation platform, and the Flux machine-learning framework provides mechanisms to include custom layers into the neural network without compromised performance.

DETAILED DESCRIPTION

This summary is provided to introduce a selection of concepts in a simplified form that are further described below in the detailed description. This summary is not intended to identify key features or essential features of the claimed subject matter, nor is it intended to be used to limit the scope of the claimed subject matter.

Figure 1:
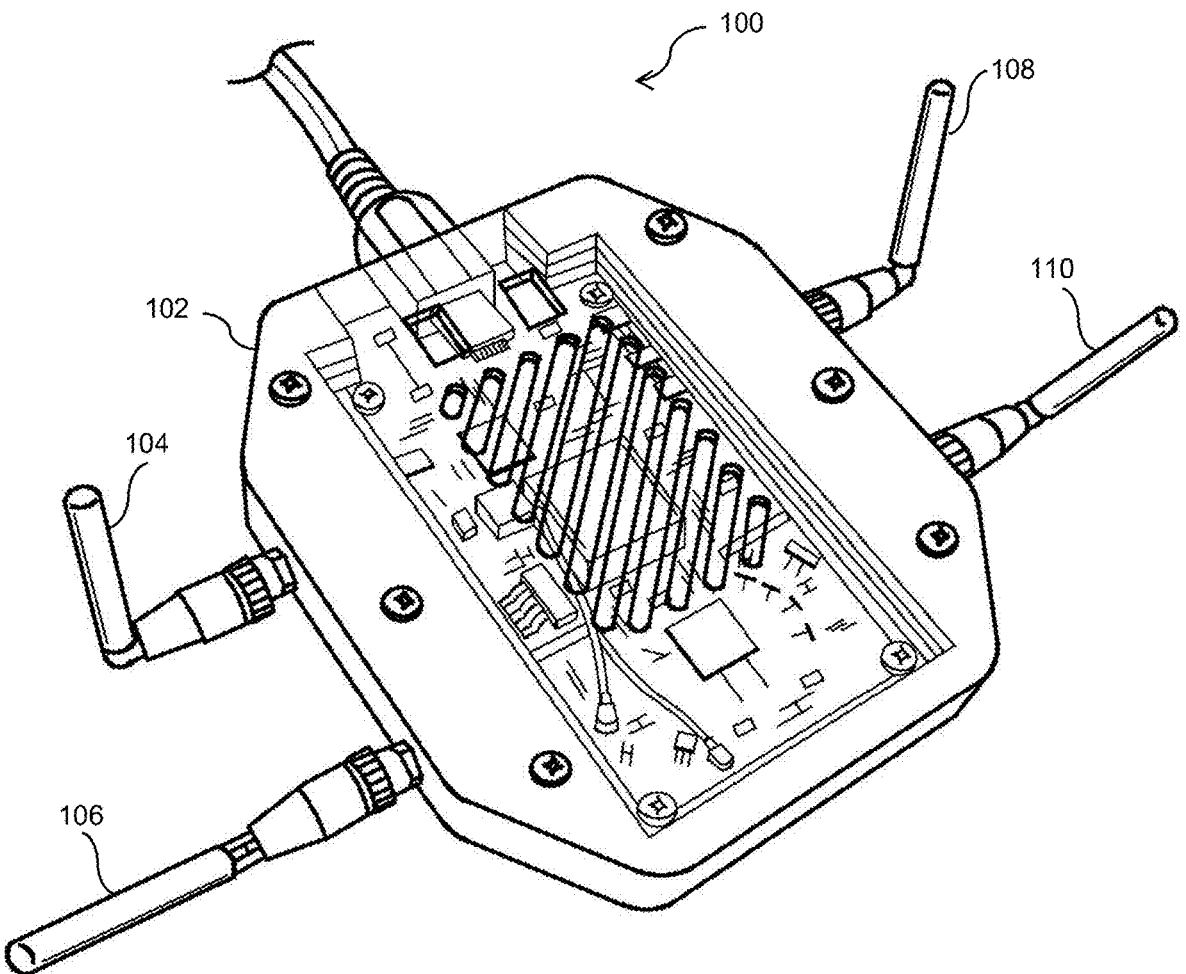
FIG. 1 depicts an exemplary off-the-shelf 2×2 antenna array in accordance with embodiments of the present disclosure.

FIG. 1 depicts a diagram 100 illustrating an exemplary off-the-shelf 2×2 antenna array 102 in accordance with embodiments of the present disclosure.

Referring to FIG. 1, the off-the-shelf 2×2 antenna array 102 includes four antennas (e.g., antennas 104, 106, 108, and 110), with two on each side. The antennas of antenna array 102 receive incoming wireless signals. In an embodiment, the antenna array transmits the incoming signals or data associated with the incoming signals to a computing device.

Figure 2:
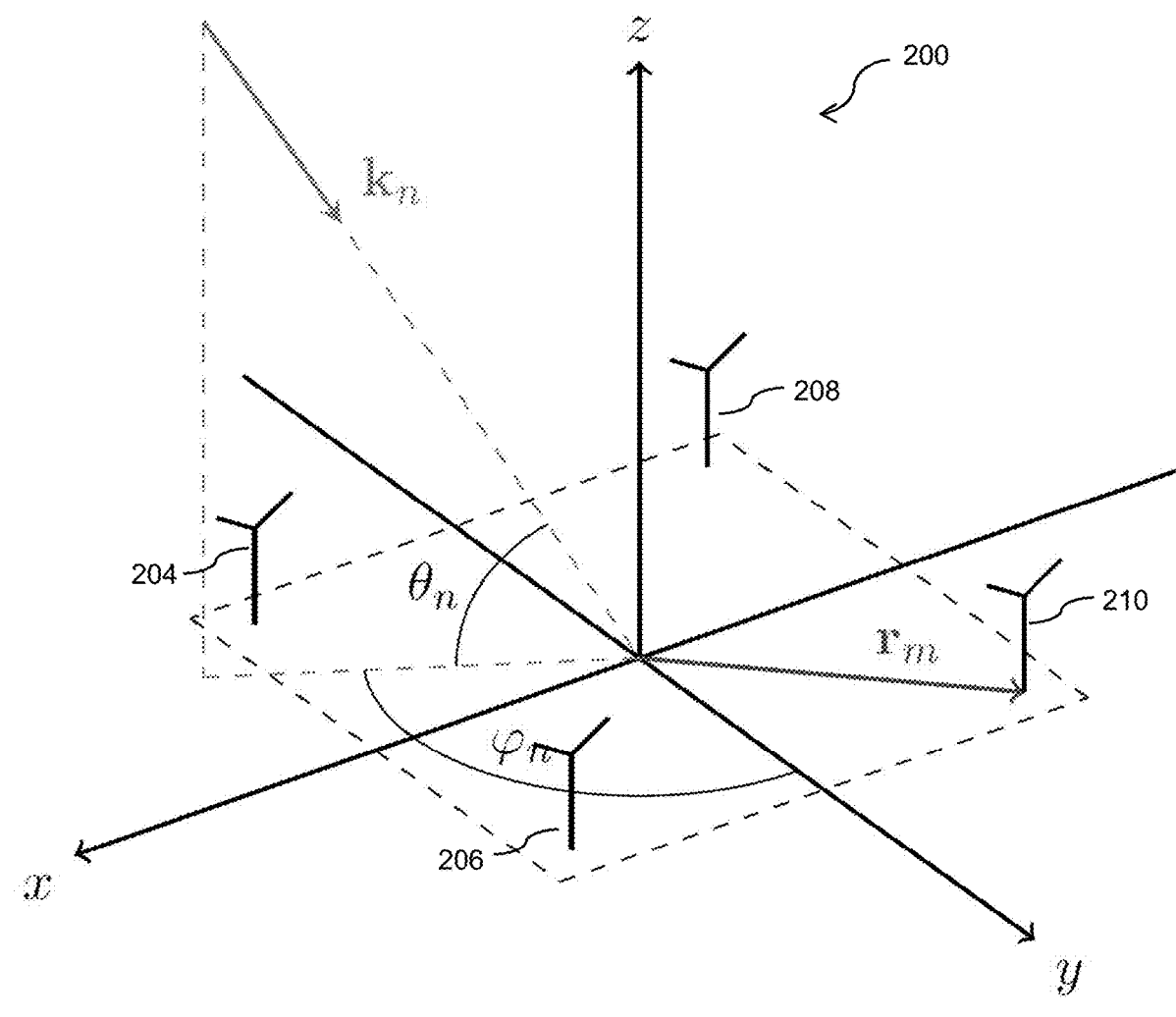
FIG. 2 depicts a graphical representation of the off-the-shelf 2×2 antenna array of FIG. 1 in accordance with embodiments of the present disclosure.

FIG. 2 depicts a graphical representation 200 of the off-the-shelf 2×2 antenna array 102 of FIG. 1 in accordance with embodiments of the present disclosure. The representation 200 shows four antennas 204, 206, 208, and 210; however, it will be understood that the graphical representation shown in FIG. 2 may be expanded to include any number of antennas in an M-element antenna array. The M-element antenna array may have an arbitrary configuration. For an impinging signal onto the antenna array, the wave vector $k(\varphi_i, \theta_i)$ is defined by the following Equation 1:

$$k(\varphi_i, \theta_i) = \frac{-2\pi}{\lambda_c} \begin{pmatrix} \cos(\theta_i)\sin(\varphi_i) \\ \cos(\theta_i)\cos(\varphi_i) \\ \sin(\theta_i) \end{pmatrix} \qquad \text{(Equation 1)}$$

In the above Equation 1, $\varphi_i$ and $\theta_i$ are the azimuth and elevation angle of the $i^{th}$ impinging signal respectively and $\lambda_c$ is the carrier wavelength. With the antenna position vector $r_M$, the steering vector is determined by the following Equation 2:

$$a(\varphi_i, \theta_i) = \begin{pmatrix} e^{-jk(\varphi_i, \theta_i)^T r_1} \\ \vdots \\ e^{-jk(\varphi_i, \theta_i)^T r_M} \end{pmatrix} \qquad \text{(Equation 2)}$$

In the above Equation 2, the steering vector $\alpha(\varphi_i, \theta_i)$ represents the phase shifts of an impinging signal from a given Direction of Arrival (DoA) described by azimuth and elevation. Prior to signal digitalization, a signal may be influenced by multiple gain and phase distortions, such as reception characteristics of each antenna element, amplifiers, downconverters, and filters.

These mismatches are expressed by the vector $c \in \mathbb{C}^M$. Note that for beamforming with any M-element antenna array, all antenna channels are down-converted with the same (or nearly the same) frequency to guarantee a stable phase relationship within a small period of time. This is essential for the estimation of the covariance matrix that is part of the neural network, which is described in more detail in the context of FIG. 3. The antenna array output for the $i^{th}$ signal yields the following Equation 3:

$$x_i(t) = \text{diag}(c)[a(\varphi_i, \theta_i)s_i(t) + n(t)] \qquad \text{(Equation 3)}$$

In the above Equation 3, $n(t) \in \mathbb{C}^M$ represents Gaussian white noise of variance $$\sigma_n^2$$

and $s_i(t)$ the incoming signal, which could be either the signal of interest or an interfering signal. The gain and phase mismatch also affects the noise term, since the dominant noise is generated at the antenna array or at the low-noise amplifier (LNA). The varying gain and phase mismatch follows down the chain.

Assuming a single signal of interest and Z interfering signals, the digitized signal yields the following Equation 4:

$$x(t) = \text{diag}(c)\left[a(\varphi, \theta)s(t) + \sum_{i=1}^{Z} a(\varphi_{Z,i}, \theta_{Z,i})s_{Z,i}(t) + n(t)\right] \qquad \text{(Equation 4)}$$

In the above Equation 4, $s(t) \in \mathbb{C}$ is the signal of interest and $s_{Z,i}(t) \in \mathbb{C}$ are the interfering signals. In one embodiment, this signal model described herein is used for training of the neural network, which is described in more detail in the context of FIG. 3.

Figure 3:
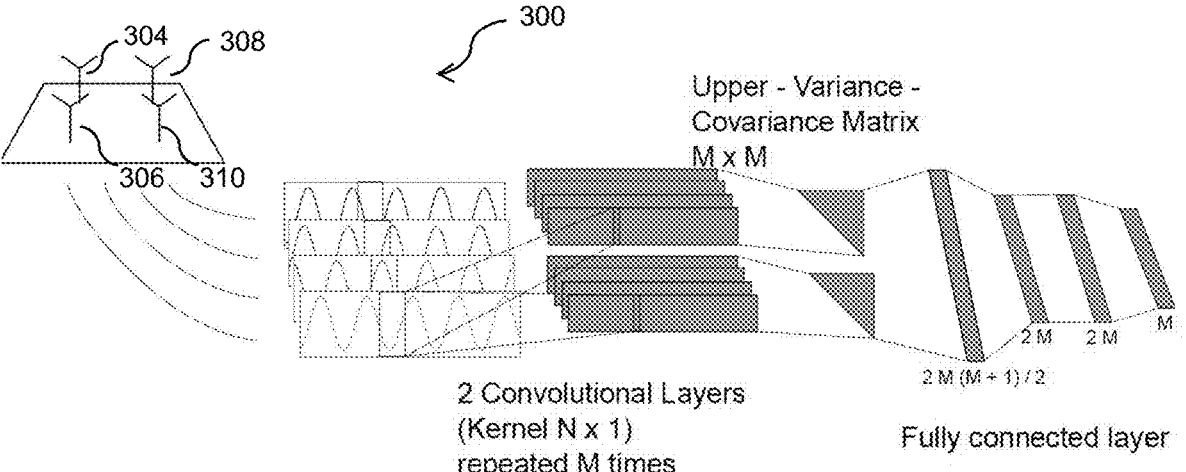
FIG. 3 depicts an exemplary neural network used for machine-learning in accordance with embodiments of the present disclosure.

FIG. 3 depicts an exemplary neural network 300 used for machine-learning in accordance with embodiments of the present disclosure. Referring to FIG. 3, the neural network 300 comprises two layers. The first layer of the neural network 300 filters the signal of interest from interfering signals in the time and frequency domain. This first layer is not an ordinary convolutional filter, but rather two convolutional filters that are repeated over the M antenna (304, 306, 308, 310) channels. For example, in one embodiment, the two convolutional layers (Kernel N×1) are repeated M times. Therefore, the same filters are applied to all antenna channels. This preserves the phase relationship among the antenna channels. The activation function of this layer is the identity, the signal is not padded before applying the filter, and the filter length has been set to 40. The next layer of the neural network is the calculation of the upper triangular block of the covariance matrix, including the variance of each channel. Only the upper triangular matrix is calculated because the covariance matrix is Hermitian, and the lower triangular matrix, therefore, holds the same but conjugated information.

From there on, multiple dense layers follow to estimate a beamformer that enhances the signal of interest and mitigates interfering signals. All of these dense layers use the following activation function shown in Equation 5:

$$c\tanh(x) = \tanh(|x|)\frac{x}{|x|} \qquad \text{(Equation 5)}$$

Figure 4A:
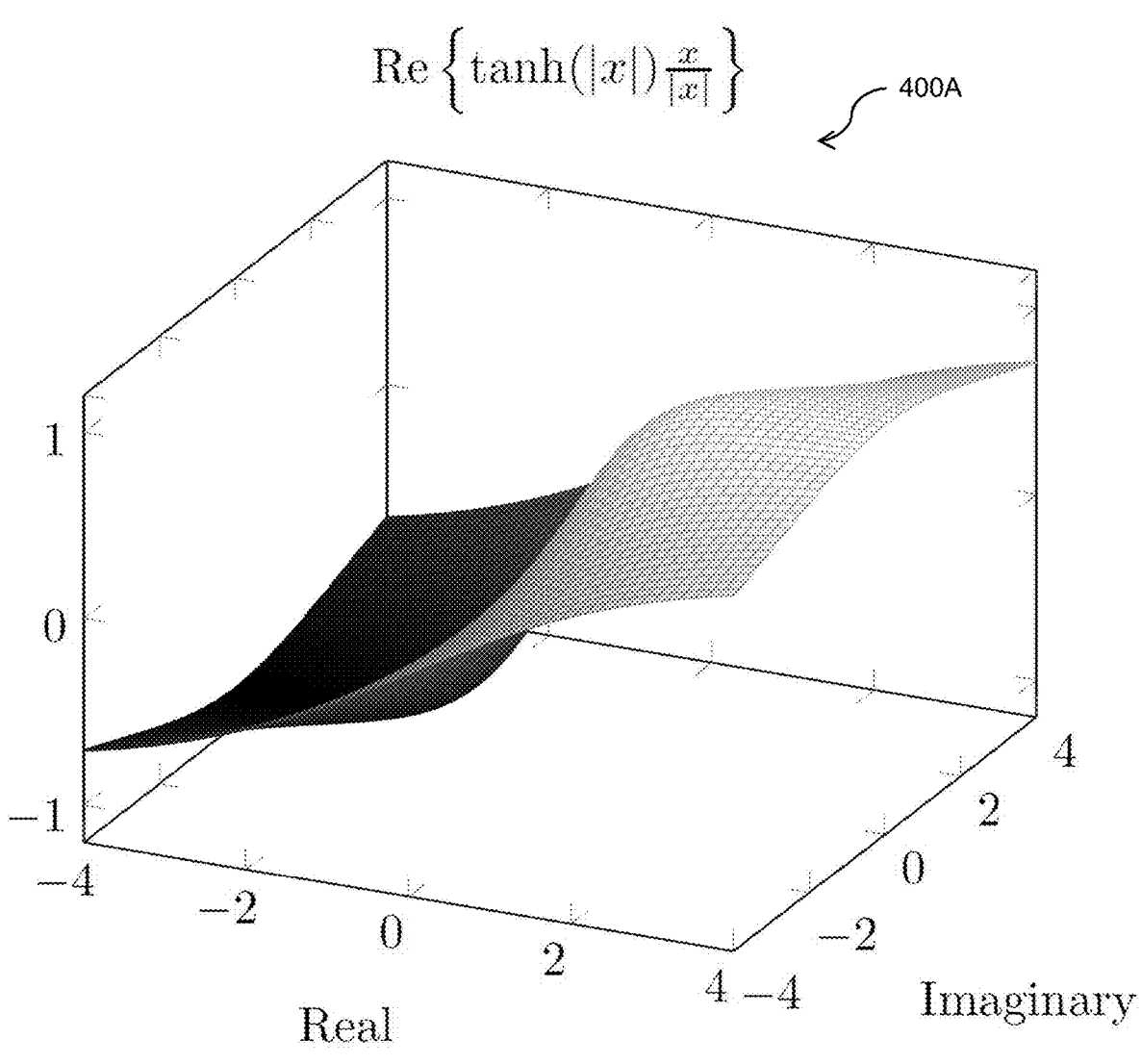
FIG. 4A depicts a three-dimensional graph showing the real part of an exemplary activation complex hyperbolic tangent function (c tanh) in accordance with embodiments of the present disclosure.
Figure 4B:
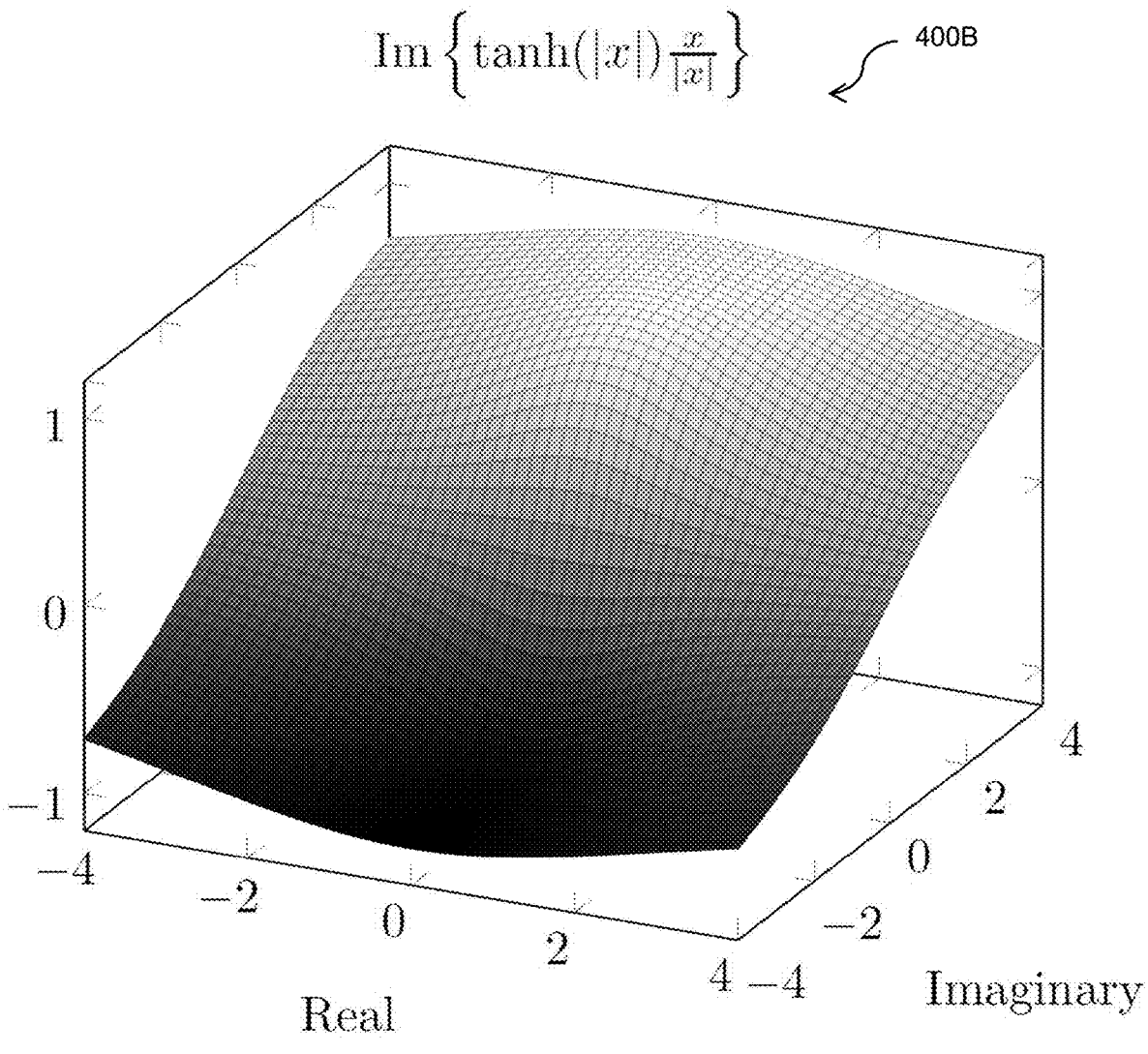
FIG. 4B depicts a three-dimensional graph showing the imaginary part of an exemplary activation function c tanh in accordance with embodiments of the present disclosure.

This activation function shown in Equation 5 was introduced by L. Pfeifenberger, M. Zohrer, and F. Pernkopf, "Deep Complex-Valued Neural Beamformers," in 2019 IEEE International Conference on Acoustics, Speech and Signal Processing (ICASSP), 2019, pp. 2902-06, the entire contents of which is incorporated by reference herein. The real and imaginary parts of this activation function are shown in FIG. 4A and FIG. 4B, respectively. In contrast to other activation functions, this activation function preserves the complex valued information.

The loss function is the mean-squared error (MSE) between the beamformed measurement and the true signal of interest.

The beamformer generated by the systems and methods described herein is normalized by its first element before it is applied to the measurement.

In one embodiment, the model is trained using simulations because there are no large real-world datasets available for training. Creating such a dataset would require a tremendous amount of work of creating physical measurements with a signal of interest and an interfering signal with varying power, different DOAs, varying gain and phase mismatches, etc., which appears to be infeasible. In contrast, using simulations allows for fast and cost-effective development of beamformers without requiring real-world calibration data. One advantage of this approach is that it allows for training of a model for beamforming and then deploying that model on multiple different antenna arrays without further training or calibration.

In one embodiment, a simulation may be carried out as follows. For each training data for the neural network, the measurement is simulated according to Equation 4. For example, in one embodiment, a 2×2 uniform rectangular array (URA) is simulated, where the mutual distance of the antenna elements is half the wavelength of the center frequency. The phase mismatch for each antenna channel is randomly taken from a uniform distribution from 0 to $2\pi$. The gain mismatch is taken from a normal distribution of N(1.0, 0.1). Both gain and phase mismatch are fixed throughout a single simulation of the measurement, but they vary with every taken measurement. This is due to the assumption that the gain and phase mismatch only slowly vary over time. The noise n(t) is simulated as white Gaussian noise.

In the following evaluation, only a single interfering signal is evaluated next to the signal of interest. Note that only M−1 signals can be separated spatially, when using an M-element antenna array. The DOA of both signals is randomly chosen in three-dimensional space. They are not restricted to be distinct from each other.

In various embodiments, different types of training have been carried out to evaluate the performance of the model with different types of signals.

The model is trained for a particular number of antenna elements with respect to a particular signal of interest. For example, the model may be trained for a 2×2 antenna array using Wi-Fi (e.g., 802.11) signals, GPS signals, or cellular signals, depending on the type of beamforming desired. In various embodiments, the signal of interest may be a continuous wave (CW) signal or a quadrature modulation (QM) signal. The model may be retrained for different signals of interest or different numbers of antenna elements; however, once the model has been trained for a particular number of antenna elements and a particular signal of interest, that model may be deployed to any antenna array with that particular number of antennas, regardless of the specific configuration of those antennas.

In one embodiment, the signal of interest is a continuous wave (CW) signal at the center frequency plus a Doppler with a standard deviation of 100 Hz. The interfering signal is a CW signal with an arbitrarily chosen frequency between −2.5 MHz and 2.5 MHz around the center frequency. Thus, the model is trained with the CW signal as the signal of interest.

In another embodiment, the signal of interest is a quadrature modulation (QM) signal at the center frequency plus a Doppler with a standard deviation of 100 Hz. The code frequency is set to 2 MHz and the QM signal consists of 4 symbols. The interfering signal is a CW signal with an arbitrarily chosen frequency between −2.5 MHz and 2.5 MHz around the center frequency. Thus, the model is trained with the QM signal as the signal of interest.

In one embodiment, the model may be trained using a two-stage process, as described herein. Although two-stage training is not specifically required for the systems and methods of beamforming disclosed herein, it does provide a higher chance of converging than single-stage training. The power of the signal of interest is set to 10 decibel (dB). The symbols within the QM signal are randomized for each training set. In the first stage of the model training process, the model is trained with an interfering signal that has the same power as the signal of interest to emphasize that the structure of the signal is important instead of the signal power. In the second stage of the model training process, the model is trained with an interfering signal that has a varying power from −10 dB to 20 dB. The center frequency is set to 2.4 GHz, and the sampling frequency is set to 5 MHz. Each simulated measurement contains 200 samples, which correspond to a time span of 40 microseconds (μs). The batch size of each training set is 100. Each epoch includes the evaluation of 100 batches. For each epoch, new batches are generated by the simulator explained above. In one embodiment, the training of the model may be performed using the optimization algorithm known as Adam, which is described in D. P. Kingma and J. Ba, "Adam: A Method for Stochastic Optimization," available at https://arxiv.org/abs/1412.6980, the entire contents of which is incorporated by reference herein. In other embodiments, other known optimization algorithms may be used.

FIG. 4A depicts a three-dimensional graph 400A showing the real part of an exemplary activation complex hyperbolic tangent function (c tanh) in accordance with embodiments of the present disclosure.

FIG. 4B depicts a three-dimensional graph 400B showing the imaginary part of an exemplary activation function c tanh in accordance with embodiments of the present disclosure.

Figure 5:
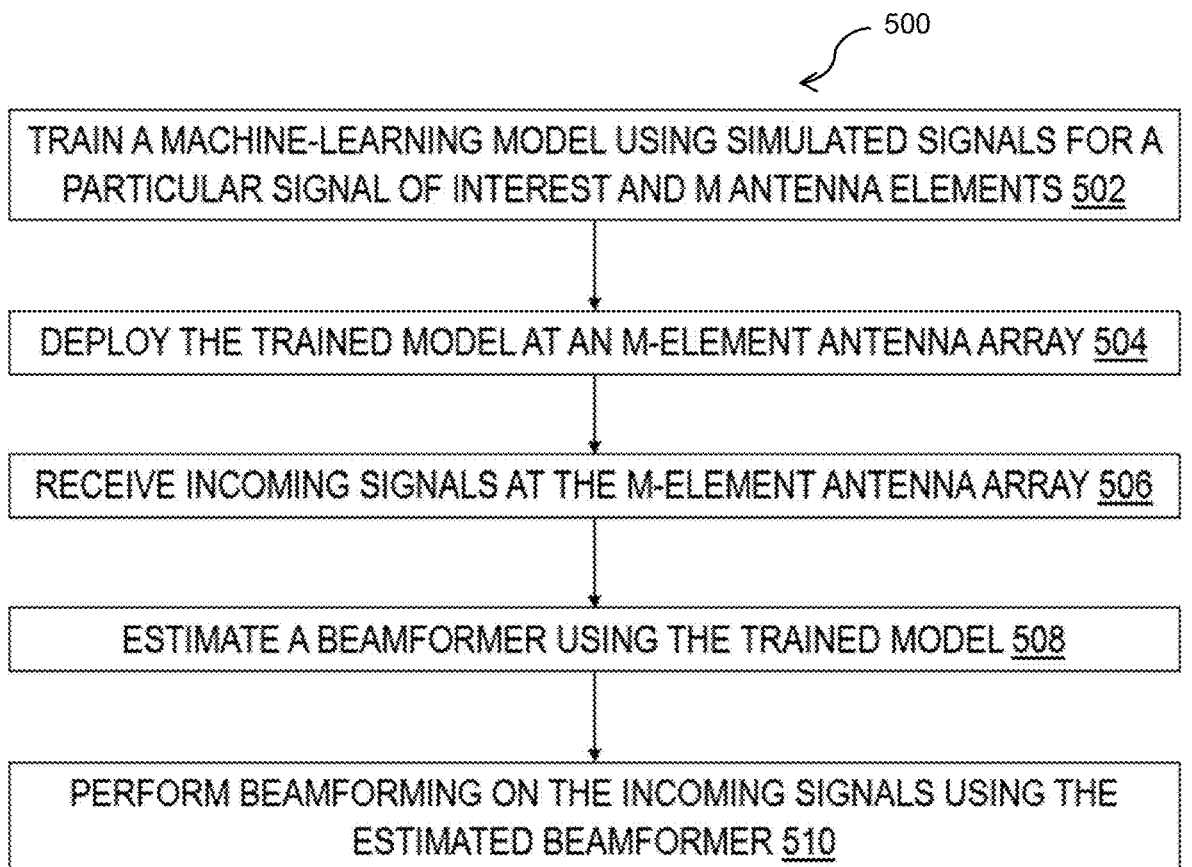
FIG. 5 shows a process flow of an exemplary method of beamforming in accordance with embodiments of the present disclosure.

FIG. 5 shows a process flow 500 of an exemplary method in accordance with embodiments of the present disclosure.

Referring to FIG. 5, at step 502, a machine-learning model is trained using simulated signals for a particular signal of interest and M antenna elements. As explained above, in one embodiment, the machine-learning model may be a neural network. At step 504, the trained model is deployed at an M-element antenna array. As explained above, once the model has been trained, it may be deployed at any M-element to perform beamforming for the signal of interest for which the model has been trained. At step 506, incoming signals are received at the M-element antenna array where the model has been deployed. The incoming signals include a signal of interest and one or more interfering signals. At step 508, a beamformer is estimated using the trained model (e.g., a neural network). At step 510, beamforming is performed on the incoming signals at the M-element antenna array where the model has been deployed using the estimated beamformer.

The methods described herein, including the exemplary method shown in FIG. 5, may be implemented on one or more computer systems having a memory and circuitry configured to execute the method described herein. The circuitry can be any of the various commercially available processors, including without limitation processors made by AMD®, Intel®, or other similar processors. Dual microprocessors, multi-core processors, and other multi-processor architectures may also be employed as circuitry. According to some examples, the circuitry can also be an application specific integrated circuit (ASIC). According to other examples, the circuitry can be any of the various commercially available graphics processing units (GPUs) for high-performance processing of the models and/or simulations. According to other examples, the methods described herein may be implemented on a cloud-based server. Such a cloud-based server may include circuitry that executes code that implements the methods described herein, including one or more processors.

Figure 6A:
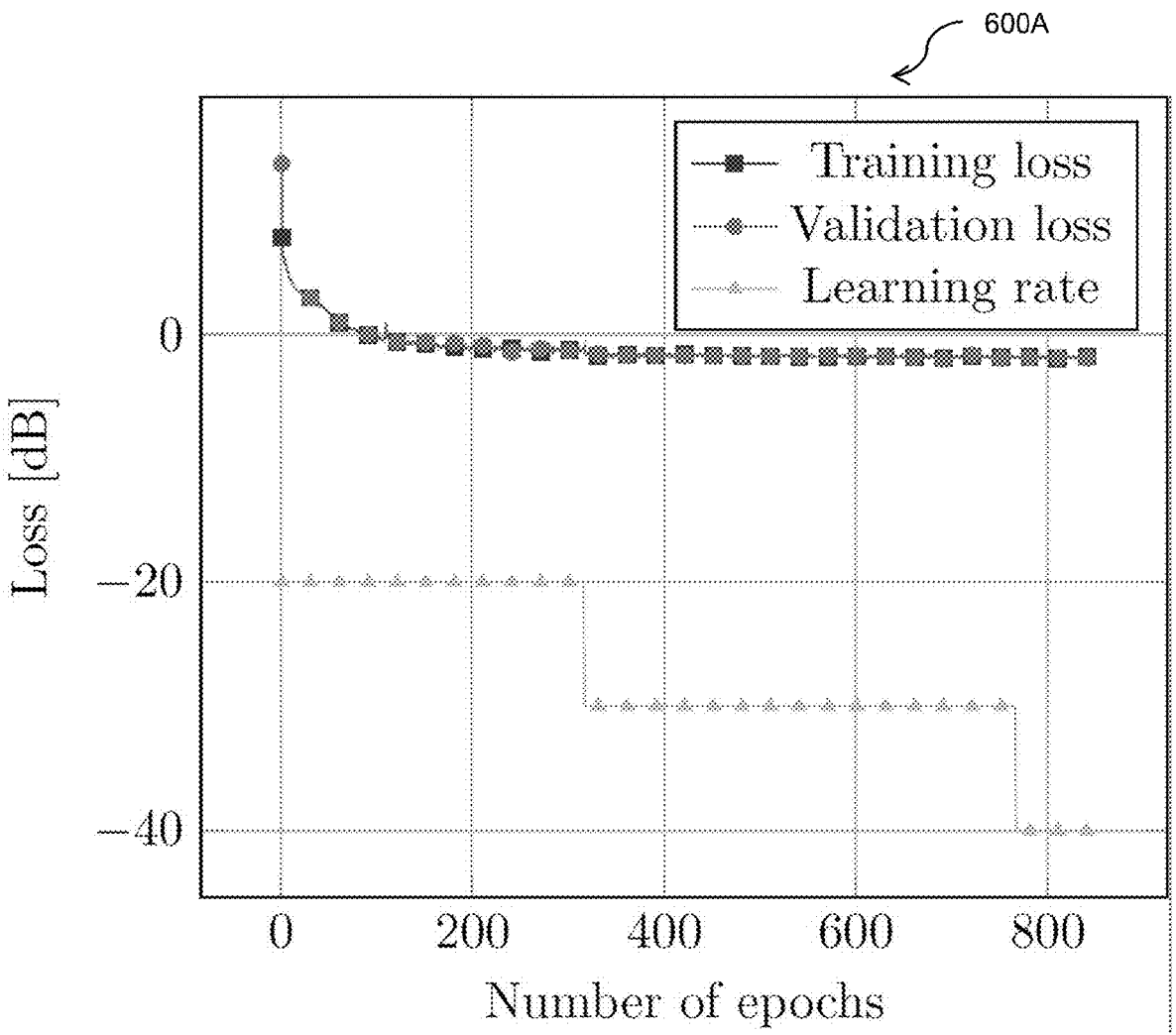
FIG. 6A depicts a graph showing the training loss, validation loss, and learning rate over number of epochs in the first stage for a continuous wave (CW) signal in accordance with embodiments of the present disclosure.
Figure 6B:
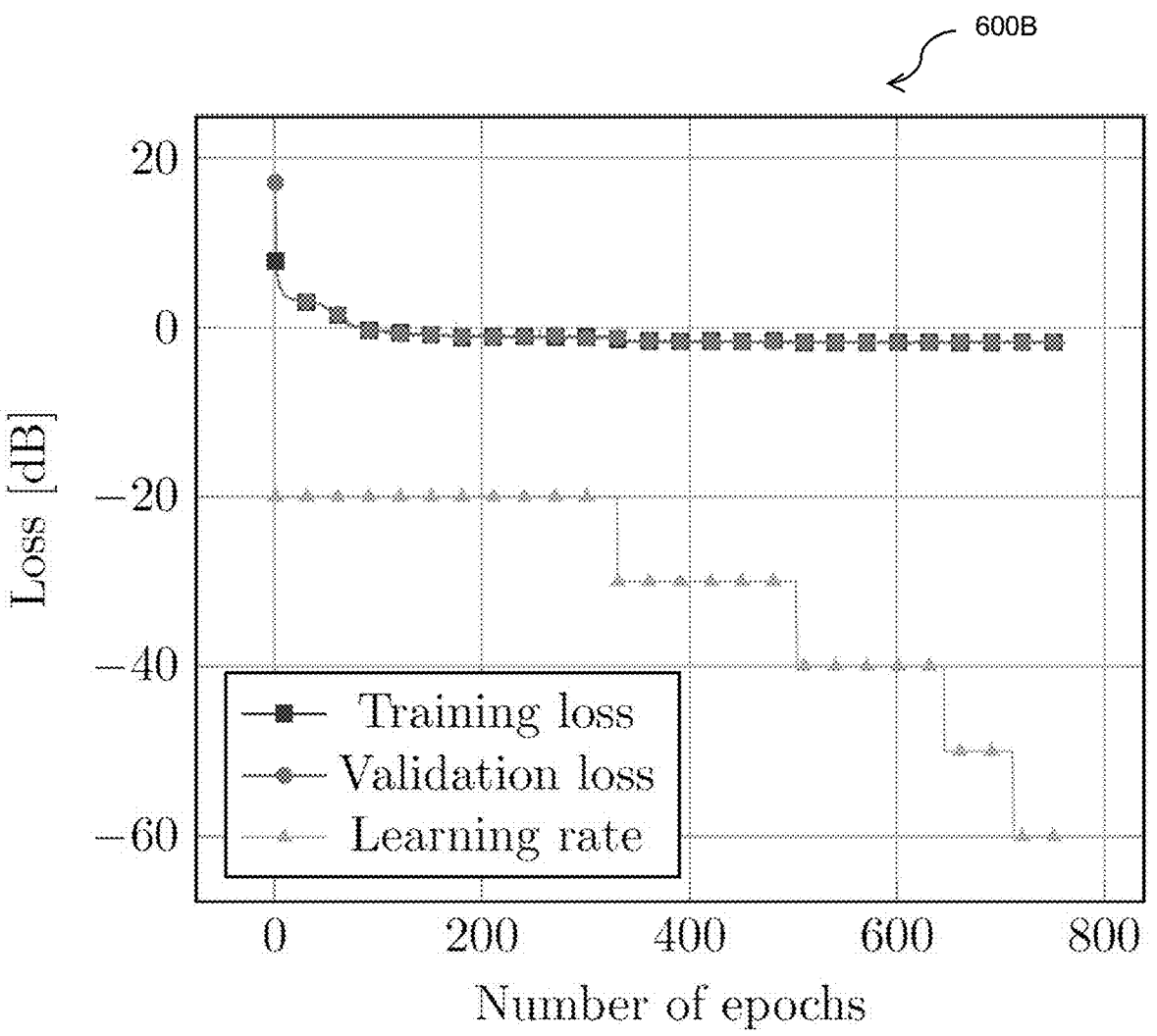
FIG. 6B depicts a graph showing the training loss, validation loss, and learning rate over number of epochs in the first stage for a quadrature modulation (QM) signal in accordance with embodiments of the present disclosure.

FIG. 6A and FIG. 6B show the results of the training loss and validation loss over the number of epochs for both signal types within the first stage. In particular, FIG. 6A depicts a graph 600A showing the training loss, validation loss, and learning rate over number of epochs in the first stage for a continuous wave (CW) signal. FIG. 6B depicts a graph 600B showing the training loss, validation loss, and learning rate over number of epochs in the first stage for quadrature modulation (QM) signal.

Figure 6C:
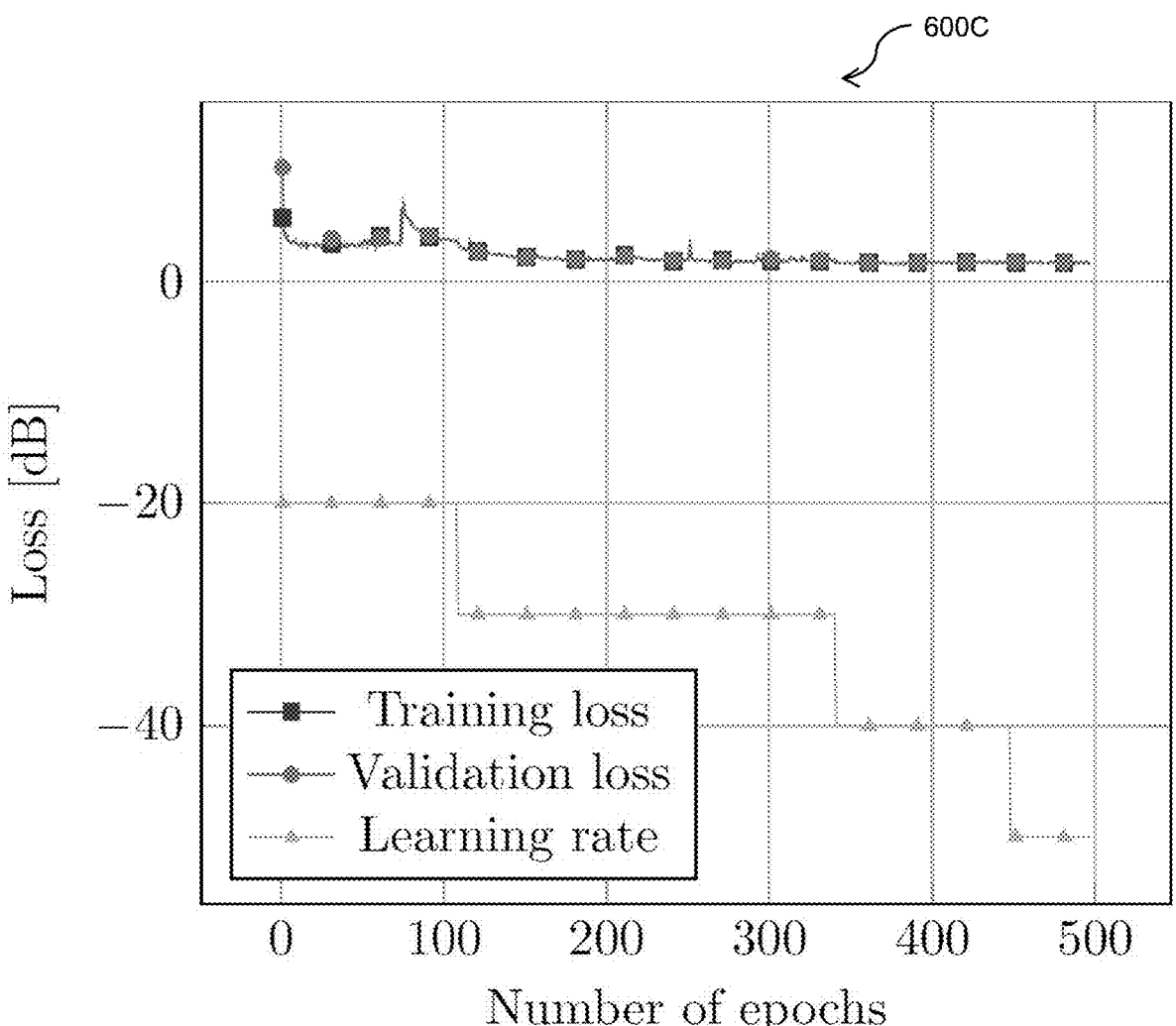
FIG. 6C depicts a graph showing the training loss, validation loss, and learning rate over number of epochs in the second stage for a continuous wave (CW) signal in accordance with embodiments of the present disclosure.
Figure 6D:
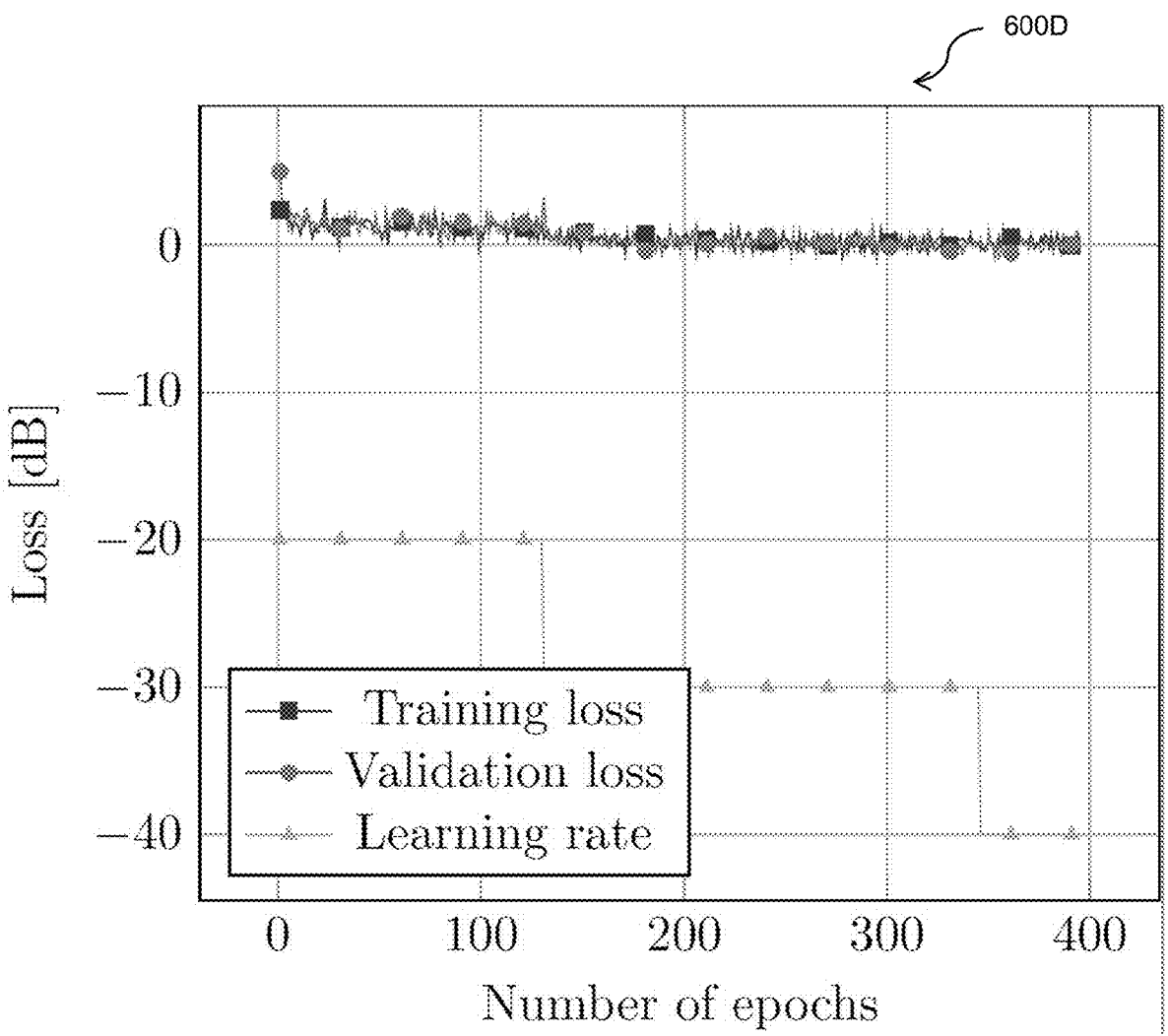
FIG. 6D depicts a graph showing the training loss, validation loss, and learning rate over number of epochs in the second stage for a quadrature modulation (QM) signal in accordance with embodiments of the present disclosure in accordance with embodiments of the present disclosure.

FIG. 6C and FIG. 6D show the corresponding results for the second stage. In particular, FIG. 6C depicts a graph 600C showing the training loss, validation loss, and learning rate over number of epochs in the second stage for a continuous wave (CW) signal. FIG. 6D depicts a graph 600D showing the training loss, validation loss, and learning rate over number of epochs in the second stage for quadrature modulation (QM) signal.

The validation is performed by the same simulation generator as explained above. The validation loss is monitored over the number of epochs. If the validation loss has not improved over the period of 50 epochs, the learning rate η is dropped by a tenth. If the validation loss has not improved over the period of 100 epochs, the training is aborted.

The performance of the systems and methods for beamforming described herein may be evaluated using a Monte-Carlo simulation. The randomly varied parameters are the DOA for the signal of interest, the interfering signal, the gain and phase mismatch, the Doppler of the signal of interest, the frequency of the interfering signal and their starting phases like in the training sequences. The power of the interfering signal is varied on the x-axis with 500 Monte-Carlo samples taken for each power level of the interfering signal.

Figure 7A:
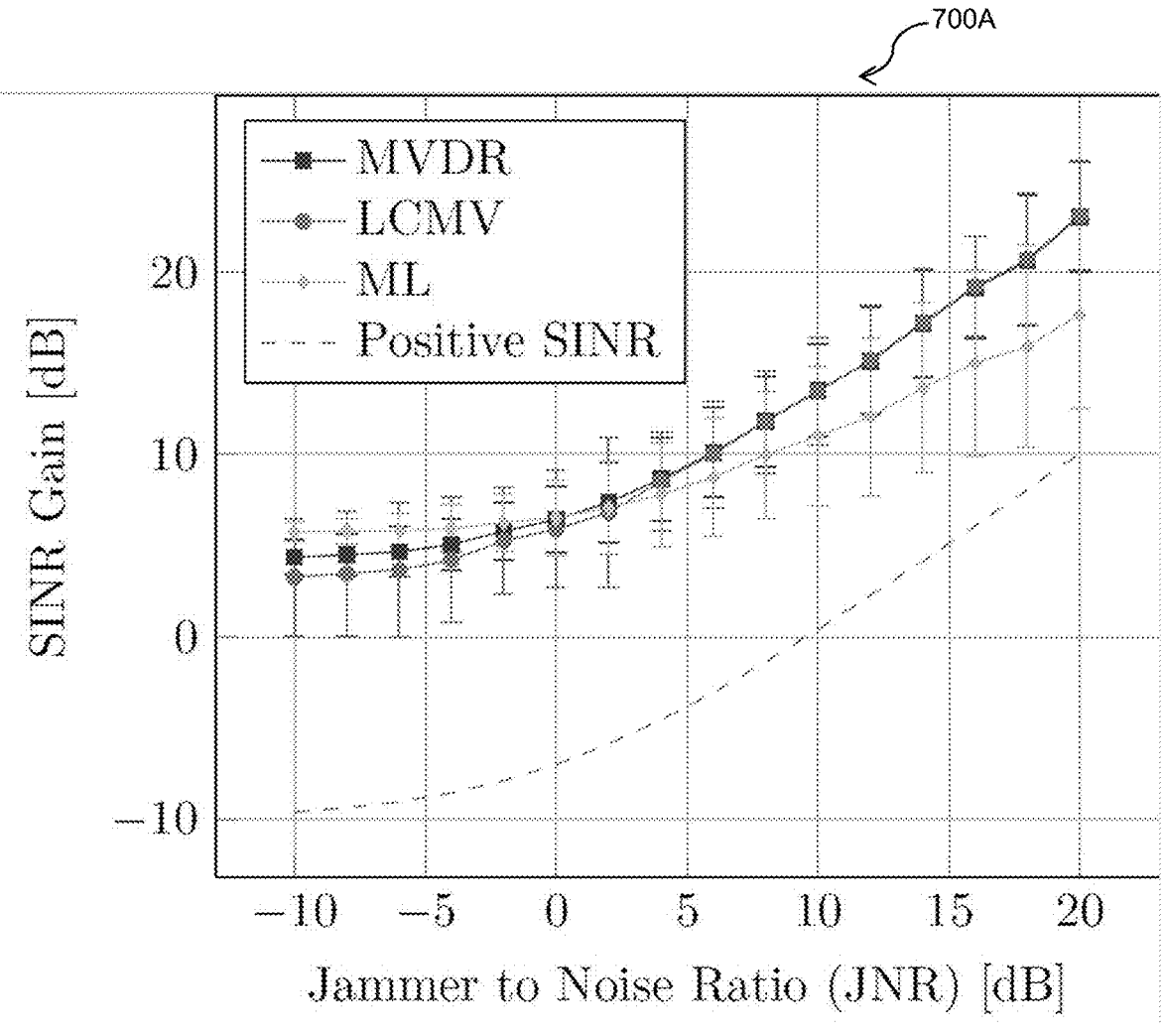
FIG. 7A depicts a graph showing the signal-to-interference ratio (SINR) with respect to the jammer-to-noise ratio (JNR) as resulting from a Monte-Carlo simulation to evaluate the machine learning beamformer against state-of-the-art beamformer for a continuous wave (CW) signal in accordance with embodiments of the present disclosure.
Figure 7B:
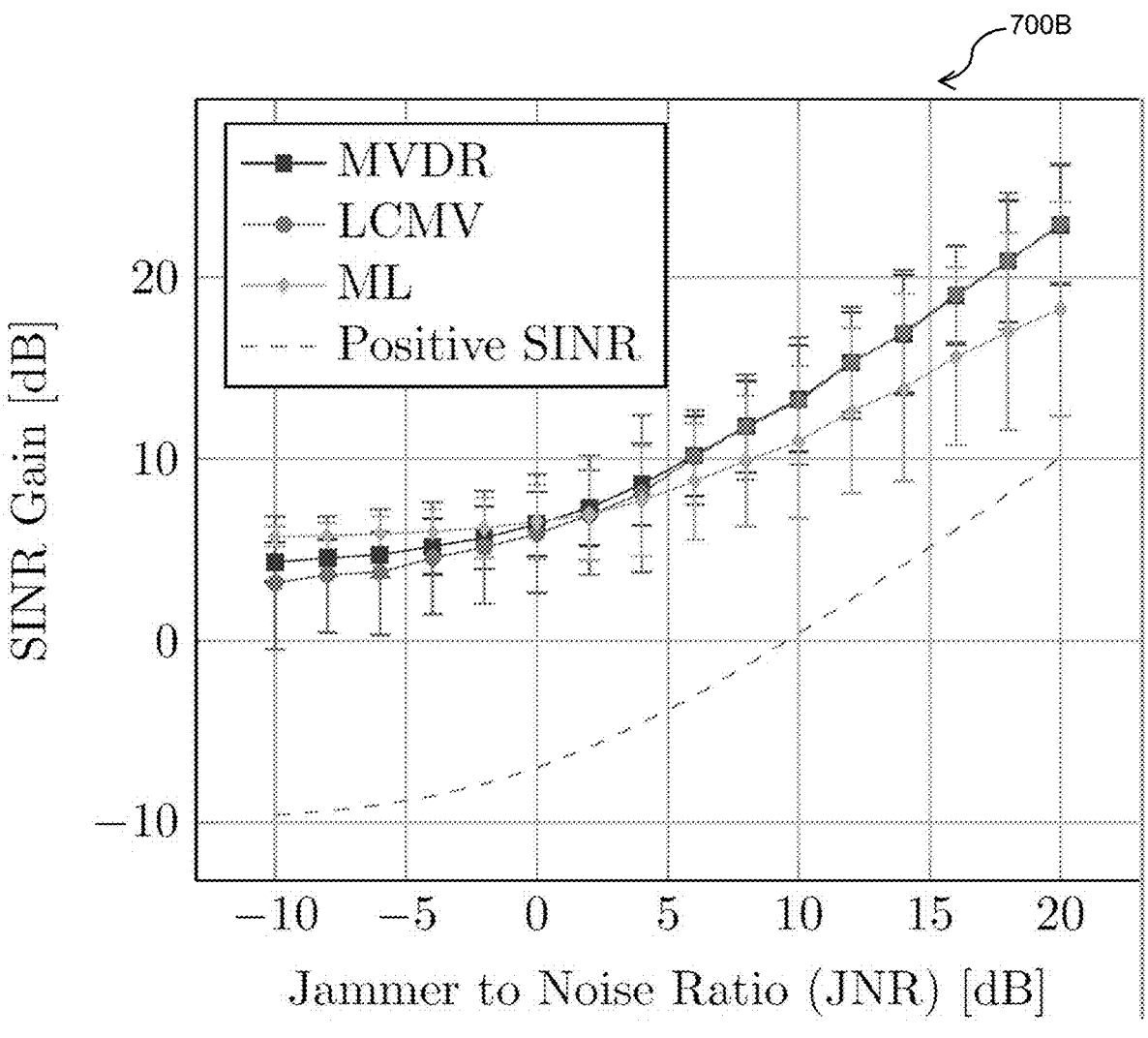
FIG. 7B depicts a graph showing the signal-to-interference ratio (SINR) with respect to the jammer-to-noise ratio (JNR) as resulting from a Monte-Carlo simulation to evaluate the machine learning beamformer against state-of-the-art beamformer for a quadrature modulation (QM) signal in accordance with embodiments of the present disclosure.

FIG. 7A and FIG. 7B show comparisons of the performance of the systems and methods for beamforming described herein compared to MVDR and LCMV beamformers, which represent current state-of-the-art beamformers in accordance with embodiments of the present disclosure. In particular, FIG. 7A depicts a graph 700A showing the signal-to-interference ratio (SINR) with respect to the jammer-to-noise ratio (JNR) as resulting from a Monte-Carlo simulation to evaluate the machine learning beamformer against state-of-the-art beamformers for a continuous wave (CW) signal. FIG. 7B depicts a graph 700B showing the signal-to-interference ratio (SINR) with respect to the jammer-to-noise ratio (JNR) as resulting from a Monte-Carlo simulation to evaluate the machine-learning beamformer described herein against state-of-the-art beamformers for a quadrature modulation (QM) signal.

The figure of merit is SINR gain due to application of the beamformer. Since beamforming is a linear process, it is applied to the signal of interest and the interfering signal separately to calculate the SINR. The SINR gain is the ratio of the SINR before and after the beamformer is applied. As can be seen from FIG. 7A and FIG. 7B, the machine-learning beamformer described herein outperforms the state-of-the-art beamformer for small JNRs. Moreover, it achieves the optimal gain of M=4 (e.g., approximately 6 dB) in the case of low-powered interference, whereas the state-of-the-art beamformers fall behind by a few decibels. This is due to the fact that the interfering signal is always nullified by the state-of-the-art beamformer. This projection reduces the signal space by one dimension. However, this is an unreasonably harsh measure against a low-powered interfering signal. This could be accommodated by a threshold on the power of the interfering signal. However, one advantage of the machine-learning beamformer described herein is that such thresholds are not required. This advantage is illustrated in FIG. 8A and FIG. 8B.

Figure 8A:
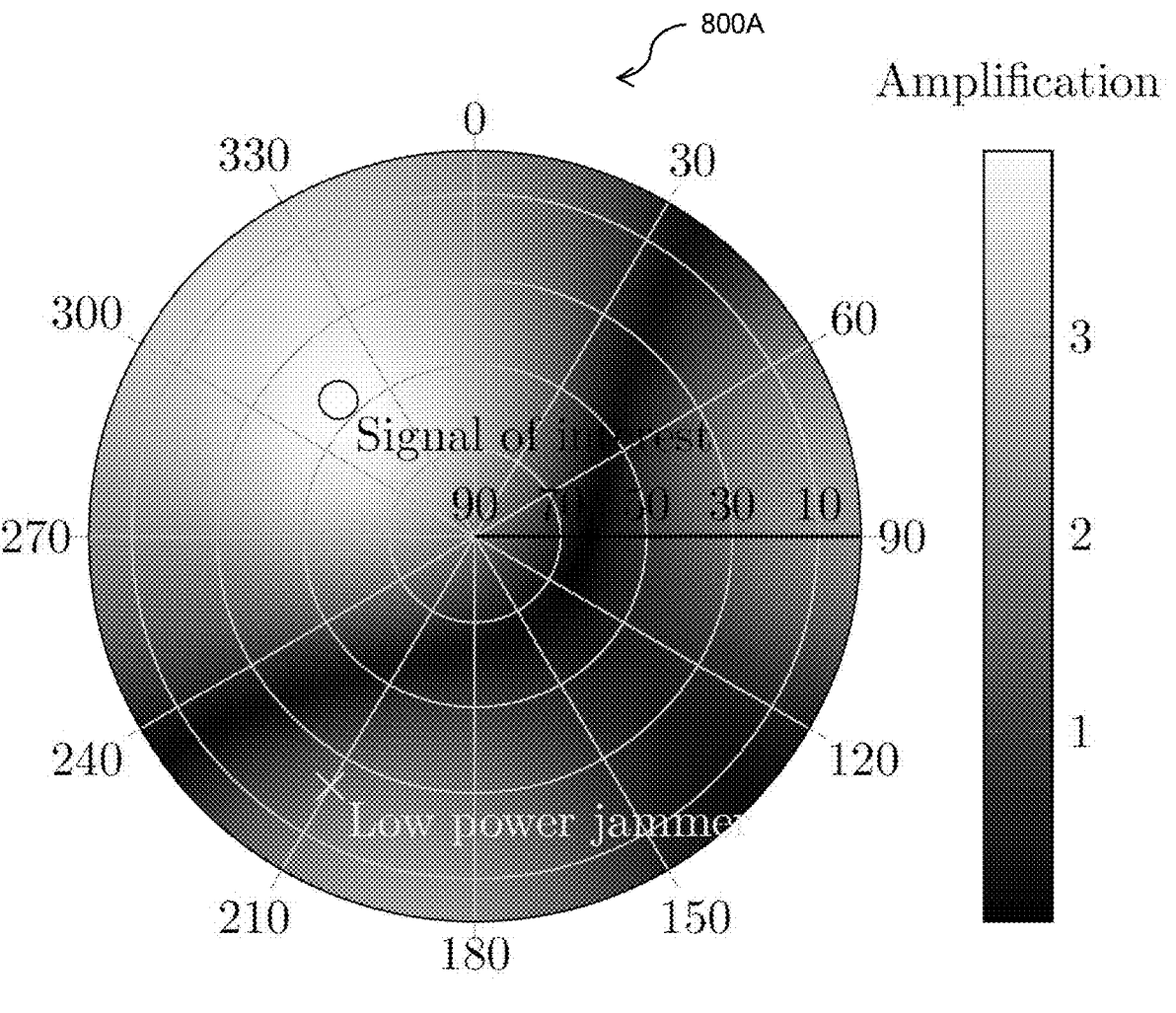
FIG. 8A depicts an exemplary beamform pattern for a low power jammer with jammer-to-noise ratio (JNR) of −10 decibel (dB) in accordance with embodiments of the present disclosure.
Figure 8B:
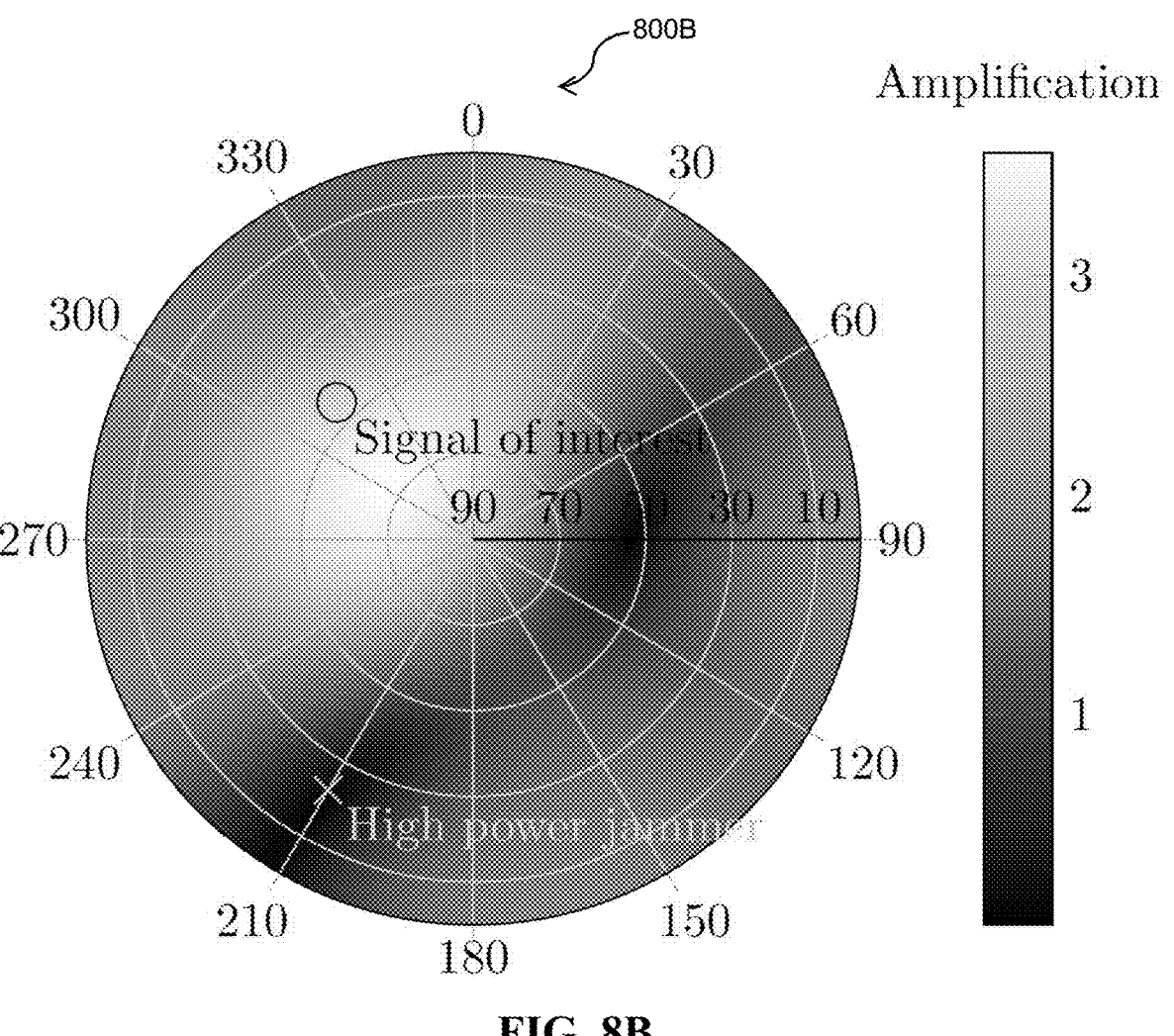
FIG. 8B depicts an exemplary beamform pattern for a high power jammer with jammer-to-noise ratio (JNR) of 20 dB in accordance with embodiments of the present disclosure.

FIG. 8A and FIG. 8B demonstrate the pattern of the amplification that is gained by applying the machine-learning beamformer in accordance with embodiments of the present disclosure. In particular, FIG. 8A depicts an exemplary beamform pattern 800A for a low-power jammer with jammer-to-noise ratio (JNR) of −10 dB. FIG. 8B depicts an exemplary beamform pattern 800B for a high-power jammer with jammer-to-noise ratio (JNR) of 20 dB.

In the case of a low-power jammer, a hard null is not required for the DOA of the jammer. Instead, the amplification for the signal of interest is maximized. In the case of a high-power jammer, it makes sense to mitigate the interfering signal to a larger extent. Due to this projection, the signal of interest cannot be maximized to its optimal value.

For high-power interference, the systems and methods of beamforming using a neural network described herein provide positive SINR; however, high-power interference should be the rare case. Therefore, in some embodiments, it is desirable to optimize the case without loud jammers. Note that the state-of-the-art beamformers used for comparison have access to the spatial information of the impinging signals, e.g., the exact steering vector of the interfering signal or the steering vector of the signal of interest. Such vectors can be difficult to estimate in a dynamic scenario, especially if gain and phase mismatches between antenna channels are considered within the RF chain.

In contrast, the systems and methods of beamforming using a machine-learning model described herein calculate the beamformer based on only the incoming measurement. They do so by incorporating the time, frequency, and spatial domain.

The systems and methods for beamforming using a machine-learning model described herein incorporate the calculation of covariance matrices into a neural-network architecture. Compared to the state-of-the-art beamformers, the systems and methods of beamforming using a machine-learning model described herein do not require the steering vector of the interfering signal nor does they require the steering vector of the signal of interest. Thus, one advantage of the systems and methods of beamforming using a machine-learning model described herein is that they can find the signal of interest by only evaluating the incoming measurement. The machine-learning model (e.g., neural network) returns a beamformer that enhances the signal of interest and mitigates any interfering signal in such a way that the SINR is increased. Thereby, it performs better than the compared state-of-the-art beamformers for low JNRs. No threshold is required to detect and mitigate an interfering signal. The machine-learning model (e.g., neural network) is self-contained in the sense that it gets the (disturbed) measurement as an input and outputs the clean signal of interest by applying the beamformer.

Figure 9:
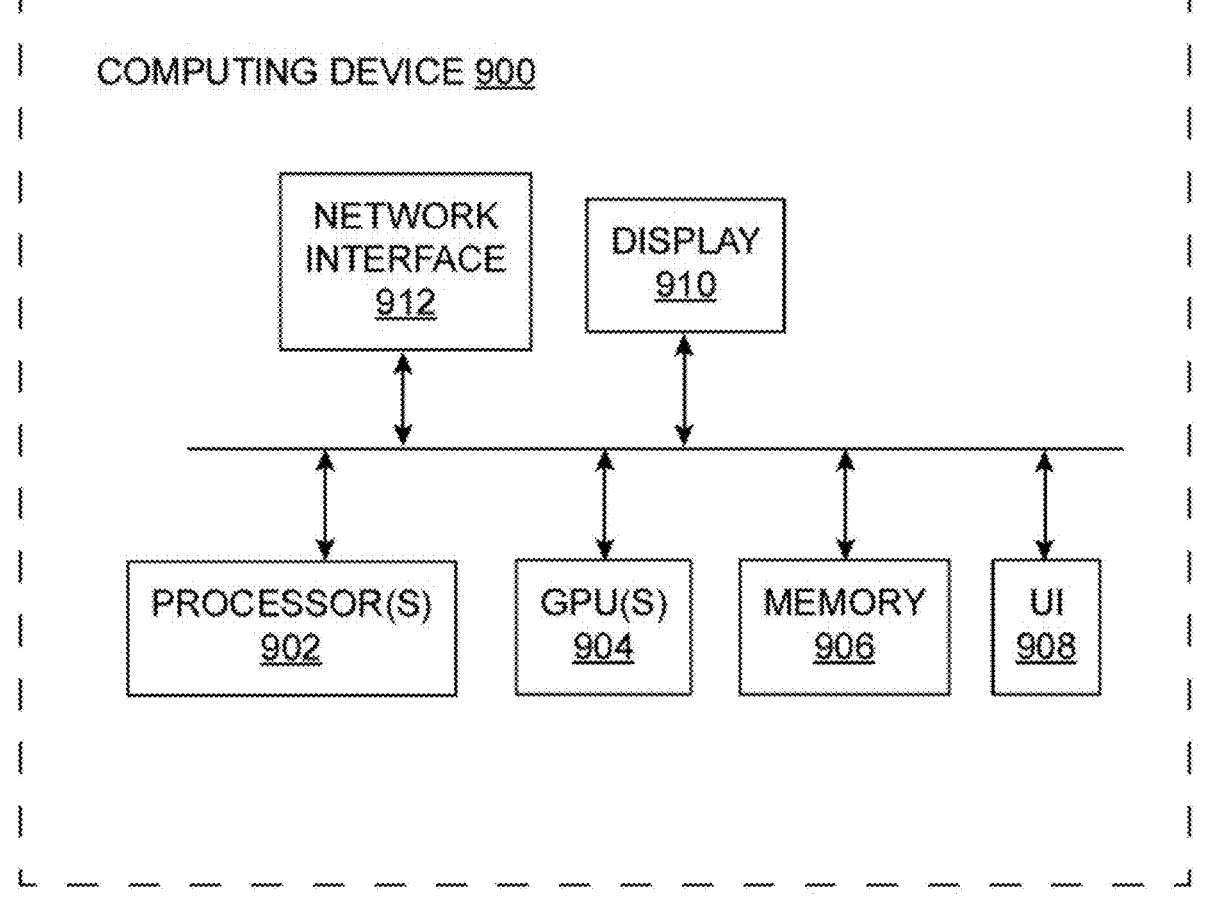
FIG. 9 depicts a block diagram illustrating one embodiment of a computing device that implements the systems and methods for beamforming in accordance with embodiments of the present disclosure.

FIG. 9 depicts a block diagram illustrating one embodiment of a computing device that implements the systems and methods for beamforming in accordance with embodiments of the present disclosure. Referring to FIG. 9, the computing device 900 may include at least one processor 902, at least one graphical processing unit ("GPU") 904, a memory 906, a user interface ("UI") 908, a display 910, and a network interface 912. The memory 906 may be partially integrated with the processor(s) 902 and/or the GPU(s) 904. The UI 908 may include a keyboard and a mouse. The display 910 and the UI 908 may provide any of the GUIs in the embodiments of this disclosure.

In another embodiment, a computing device (e.g., computing device 900 of FIG. 9) is disclosed for performing blind adaptive beamforming on narrowband signals using an uncalibrated antenna array. The computing device includes a memory and at least one processor. The computing device is configured for receiving data associated with incoming signals at an M-element antenna array. The incoming signals include the signal of interest and one or more interfering signals. The computing device is further configured for estimating a beamformer based on the data associated with the incoming signals using a machine-learning model. The machine learning model has been trained for M antenna elements using a signal of a same type as the signal of interest. The computing device is further configured for performing beamforming on the incoming signals using the beamformer to enhance the signal of interest and mitigate interfering signals. The beamformer does not require a calibrated RF front-end and does not require information about a DOA of the signal of interest.

The computing device may be a server, a workstation, a personal computer, a laptop, smart tablet, a smart phone, or the like. The computing device may be configured to be communicatively coupled with a blind adaptive signal beamformer as previously described.

In other embodiments, the computing device may be implemented within a blind adaptive signal beamformer coupled with the M-element antenna array.

In another embodiment, a non-transitory computer-readable storage medium (e.g., memory 906 of FIG. 9 or the like) is disclosed. The non-transitory computer-readable storage medium stores instructions to be implemented on a computing device including at least one processor. The instructions when executed by the at least one processor cause the computing device to perform a method for performing blind adaptive beamforming on narrowband signals using an uncalibrated antenna array. The method includes receiving data associated with incoming signals at an M-element antenna array. The incoming signals include the signal of interest and one or more interfering signals. The method further includes estimating a beamformer based on the data associated with the incoming signals using a machine-learning model. The machine learning model has been trained for M antenna elements using a signal of a same type as the signal of interest. The method further includes performing beamforming on the incoming signals using the beamformer to enhance the signal of interest and mitigate interfering signals. The beamformer does not require a calibrated RF front-end and does not require information about a DOA of the signal of interest.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Machine learning (ML) is the use of computer algorithms that can improve automatically through experience and by the use of data. Machine learning algorithms build a model based on sample data, known as training data, to make predictions or decisions without being explicitly programmed to do so. Machine learning algorithms are used where it is unfeasible to develop conventional algorithms to perform the needed tasks.

In certain embodiments, instead of or in addition to performing the functions described herein manually, the system may perform some or all of the functions using machine learning or artificial intelligence. Thus, in certain embodiments, machine learning-enabled software relies on unsupervised and/or supervised learning processes to perform the functions described herein in place of a human user.

Machine learning may include identifying one or more data sources and extracting data from the identified data sources. Instead of or in addition to transforming the data into a rigid, structured format, in which certain metadata or other information associated with the data and/or the data sources may be lost, incorrect transformations may be made, or the like, machine learning-based software may load the data in an unstructured format and automatically determine relationships between the data. Machine learning-based software may identify relationships between data in an unstructured format, assemble the data into a structured format, evaluate the correctness of the identified relationships and assembled data, and/or provide machine learning functions to a user based on the extracted and loaded data, and/or evaluate the predictive performance of the machine learning functions (e.g., "learn" from the data).

In certain embodiments, machine learning-based software assembles data into an organized format using one or more unsupervised learning techniques. Unsupervised learning techniques can identify relationship between data elements in an unstructured format.

In certain embodiments, machine learning-based software can use the organized data derived from the unsupervised learning techniques in supervised learning methods to respond to analysis requests and to provide machine learning results, such as a classification, a confidence metric, an inferred function, a regression function, an answer, a prediction, a recognized pattern, a rule, a recommendation, or other results. Supervised machine learning, as used herein, comprises one or more modules, computer executable program code, logic hardware, and/or other entities configured to learn from or train on input data, and to apply the learning or training to provide results or analysis for subsequent data.

Machine learning-based software may include a model generator, a training data module, a model processor, a model memory, and a communication device. Machine learning-based software may be configured to create prediction models based on the training data. In some embodiments, machine learning-based software may generate decision trees. For example, machine learning-based software may generate nodes, splits, and branches in a decision tree. Machine learning-based software may also calculate coefficients and hyper parameters of a decision tree based on the training data set. In other embodiments, machine learning-based software may use Bayesian algorithms or clustering algorithms to generate predicting models. In yet other embodiments, machine learning-based software may use association rule mining, artificial neural networks, and/or deep learning algorithms to develop models. In some embodiments, to improve the efficiency of the model generation, machine learning-based software may utilize hardware optimized for machine learning functions, such as an FPGA.

The system disclosed herein may be implemented as a client/server type architecture but may also be implemented using other architectures, such as cloud computing, software as a service model (SaaS), a mainframe/terminal model, a stand-alone computer model, a plurality of non-transitory lines of code on a computer readable medium that can be loaded onto a computer system, a plurality of non-transitory lines of code downloadable to a computer, and the like.

The system may be implemented as one or more computing devices that connect to, communicate with and/or exchange data over a link that interact with each other. Each computing device may be a processing unit-based device with sufficient processing power, memory/storage and connectivity/communications capabilities to connect to and interact with the system. For example, each computing device may be an Apple iPhone or iPad product, a Blackberry or Nokia product, a mobile product that executes the Android operating system, a personal computer, a tablet computer, a laptop computer and the like and the system is not limited to operate with any particular computing device. The link may be any wired or wireless communications link that allows the one or more computing devices and the system to communicate with each other. In one example, the link may be a combination of wireless digital data networks that connect to the computing devices and the Internet. The system may be implemented as one or more server computers (all located at one geographic location or in disparate locations) that execute a plurality of lines of non-transitory computer code to implement the functions and operations of the system as described herein. Alternatively, the system may be implemented as a hardware unit in which the functions and operations of the back-end system are programmed into a hardware system. In one implementation, the one or more server computers may use Intel® processors, run the Linux operating system, and execute Java, Ruby, Regular Expression, Flex 4.0, SQL etc.

In some embodiments, each computing device may further comprise a display and a browser application so that the display can display information generated by the system. The browser application may be a plurality of non-transitory lines of computer code executed by a processing unit of the computing device. Each computing device may also have the usual components of a computing device such as one or more processing units, memory, permanent storage, wireless/wired communication circuitry, an operating system, etc.

The system may further comprise a server (that may be software based or hardware based) that allows each computing device to connect to and interact with the system such as sending information and receiving information from the computing devices that is executed by one or more processing units. The system may further comprise software- or hardware-based modules and database(s) for processing and storing content associated with the system, metadata generated by the system for each piece of content, user preferences, and the like.

In one embodiment, the system includes one or more processors, server, clients, data storage devices, and non-transitory computer readable instructions that, when executed by a processor, cause a device to perform one or more functions. It is appreciated that the functions described herein may be performed by a single device or may be distributed across multiple devices.

When a user interacts with the system, the user may use a frontend client application. The client application may include a graphical user interface that allows the user to select one or more digital files. The client application may communicate with a backend cloud component using an application programming interface (API) comprising a set of definitions and protocols for building and integrating application software. As used herein, an API is a connection between computers or between computer programs that is a type of software interface, offering a service to other pieces of software. A document or standard that describes how to build or use such a connection or interface is called an API specification. A computer system that meets this standard is said to implement or expose an API. The term API may refer either to the specification or to the implementation.

Software-as-a-service (SaaS) is a software licensing and delivery model in which software is licensed on a subscription basis and is centrally hosted. SaaS is typically accessed by users using a thin client, e.g., via a web browser. SaaS is considered part of the nomenclature of cloud computing.

Many SaaS solutions are based on a multitenant architecture. With this model, a single version of the application, with a single configuration (hardware, network, operating system), is used for all customers ("tenants"). To support scalability, the application is installed on multiple machines (called horizontal scaling). The term "software multi-tenancy" refers to a software architecture in which a single instance of software runs on a server and serves multiple tenants. Systems designed in such manner are often called shared (in contrast to dedicated or isolated). A tenant is a group of users who share a common access with specific privileges to the software instance. With a multitenant architecture, a software application is designed to provide every tenant a dedicated share of the instance—including its data, configuration, user management, tenant individual functionality and non-functional properties.

The backend cloud component described herein may also be referred to as a SaaS component. One or more tenants which may communicate with the SaaS component via a communications network, such as the Internet. The SaaS component may be logically divided into one or more layers, each layer providing separate functionality and being capable of communicating with one or more other layers.

Cloud storage may store or manage information using a public or private cloud. Cloud storage is a model of computer data storage in which the digital data is stored in logical pools. The physical storage spans multiple servers (sometimes in multiple locations), and the physical environment is typically owned and managed by a hosting company. Cloud storage providers are responsible for keeping the data available and accessible, and the physical environment protected and running. People and/or organizations buy or lease storage capacity from the providers to store user, organization, or application data. Cloud storage services may be accessed through a co-located cloud computing service, a web service API, or by applications that utilize the API.

The invention claimed is:

1. A blind adaptive signal beamformer for beamforming narrowband signals using an uncalibrated antenna array, the beamformer comprising:

an M-element antenna array configured to receive incoming signals, wherein the incoming signals include a signal of interest and one or more interfering signals; and a trained machine-learning model communicatively coupled to the M-element antenna array, wherein the trained machine-learning model has been trained for M antenna elements using a signal of a same type as the signal of interest, wherein:

the trained machine-learning model is configured for:

filtering the signal of interest in the time domain and the frequency domain from the one or more interfering signals via at least one convolution filter per antenna element; and spatially mitigating the one or more interfering signals from the filtered signal of interest;

the blind adaptive signal beamformer does not require a calibrated RF front-end; and the blind adaptive signal beamformer does not require information about direction of arrival of the signal of interest.

2. The blind adaptive signal beamformer of claim 1, wherein the trained machine-learning model is a neural network.

3. The blind adaptive signal beamformer of claim 1, wherein the trained machine-learning model is a neural network comprising:

a first layer configured to filter the signal of interest from the interfering signals;

a second layer configured to calculate a covariance matrix for the neural network; and one or more dense layers configured to estimate beamforming using an activation function.

4. The blind adaptive signal beamformer of claim 1, wherein the trained machine-learning model is a neural network that has been trained using training in which:

the signal of interest is a continuous wave signal at a center frequency plus a Doppler with a standard deviation of 100 Hz; and each interfering signal is a continuous wave interfering signal with an arbitrarily chosen frequency between −2.5 MHz and 2.5 MHz around the center frequency.

5. The blind adaptive signal beamformer of claim 1, wherein the trained machine-learning model is a neural network that has been trained using training in which:

the signal of interest is a quadrature modulation signal at a center frequency plus a Doppler with a standard deviation of 100 Hz;

a code frequency is set to 2 MHz;

the quadrature modulation signal includes four symbols;

an interfering signal is a continuous wave signal with an arbitrarily chosen frequency between −2.5 MHz and 2.5 MHz around the center frequency;

a power of the signal of interest is set to 10 decibel (dB); and the symbols within the quadrature modulation signal are randomized for each training set.

6. The blind adaptive signal beamformer of claim 1, wherein:

the trained machine-learning model is a neural network that has been trained in a two-stage process;

in a first stage of the two-stage process, the neural network is trained with an interfering signal that has an approximate same power as the signal of interest; and in a second stage of the two-stage process, the neural network is trained with an interfering signal that has a varying power from −10 decibel (dB) to 20 dB.

7. The blind adaptive signal beamformer of claim 1, wherein:

a center frequency is set to 2.4 GHz;

a sampling frequency is set to 5 MHz;

each simulated measurement contains 200 samples that correspond to a time span of 40 microseconds;

a batch size of each training set is 100; and each epoch includes evaluation of 100 batches.

8. The blind adaptive signal beamformer of claim 1, wherein the trained machine-learning model is trained using an "Adam" optimization algorithm.

9. A method for performing blind adaptive beamforming on narrowband signals using an uncalibrated antenna array, the method comprising:

training a machine-learning model for M antenna elements using a signal of a same type as a signal of interest;

deploying the machine-learning model at an M-element antenna array;

receiving incoming signals at the M-element antenna array, wherein the incoming signals include the signal of interest and one or more interfering signals;

estimating a beamformer using the machine-learning model; and performing beamforming on the incoming signals using the machine learning model for:

filtering the signal of interest in the time domain and the frequency domain from the one or more interfering signals via at least one convolution filter per antenna element; and spatially mitigating the one or more interfering signals from the filtered signal of interest, wherein:

the beamformer does not require a calibrated RF front-end; and the beamformer does not require information about direction of arrival (DOA) of the signal of interest.

10. The method of claim 9, wherein the machine-learning model is a neural network.

11. The method of claim 9, wherein trained machine-learning model is a neural network comprising:

a first layer configured to filter the signal of interest from the one or more interfering signals;

a second layer configured to calculate a covariance matrix for the neural network; and one or more dense layers configured to estimate beamforming using an activation function.

12. The method of claim 9, wherein training the machine-learning model includes:

training a neural network using a first continuous wave signal at a center frequency plus a Doppler with a standard deviation of 100 Hz as the signal of interest; and training the neural network using a second continuous wave signal with an arbitrarily chosen frequency between −2.5 MHz and 2.5 MHz around the center frequency for each of a plurality of interfering signals.

13. The method of claim 9, wherein training the machine-learning model includes:

training a neural network using a quadrature modulation signal at a center frequency plus a Doppler with a standard deviation of 100 Hz as the signal of interest, wherein the quadrature modulation signal includes four symbols; and training the neural network using a continuous wave signal with an arbitrarily chosen frequency between −2.5 MHz and 2.5 MHz around the center frequency for each of a plurality of interfering signals, wherein:

a code frequency is set to 2 MHz;

a power of the signal of interest is set to 10 decibel (dB); and the symbols within the quadrature modulation signal are randomized for each training set.

14. The method of claim 9, wherein:

training the machine-learning model includes a training process with a first stage and a second stage;

in the first stage of the training process, a neural network is trained with an interfering signal that has an approximate same power as the signal of interest; and in the second stage of the training process, the neural network is trained with an interfering signal that has a varying power from −10 decibel (dB) to 20 dB.

15. The method of claim 9, wherein:

a center frequency is set to 2.4 GHz;

a sampling frequency is set to 5 MHz;

each simulated measurement contains 200 samples that correspond to a time span of 40 microseconds;

a batch size of each training set is 100; and each epoch includes evaluation of 100 batches.

16. The method of claim 9, wherein training of the machine-learning model uses an "Adam" optimization algorithm.

17. A computing device for performing blind adaptive beamforming on narrowband signals using an uncalibrated antenna array, the computing device comprising:

a memory; and at least one processor configured for:

receiving data associated with incoming signals at an M-element antenna array, wherein the incoming signals include the signal of interest and one or more interfering signals;

estimating a beamformer based on the data associated with the incoming signals using a machine-learning model that has been trained for M antenna elements using a signal of a same type as the signal of interest; and performing beamforming on the incoming signals using the machine learning model for:

filtering the signal of interest in the time domain and the frequency domain from the one or more interfering signals via at least one convolution filter per antenna element; and spatially mitigating the one or more interfering signals from the filtered signal of interest, wherein:

the beamformer does not require a calibrated RF front-end; and the beamformer does not require information about direction of arrival (DOA) of the signal of interest.

18. The computing device of claim 17, wherein the computing device is a server, a workstation, a personal computer, a laptop, smart tablet, or a smart phone.

19. The computing device of claim 17, wherein the computing device is configured to be communicatively coupled with a blind adaptive signal beamformer.

20. The computing device of claim 17, wherein the computing device is implemented within a blind adaptive signal beamformer coupled with the M-element antenna array.

21. A non-transitory computer-readable storage medium, the non-transitory computer-readable storage medium storing instructions to be implemented on a computing device including at least one processor, the instructions when executed by the at least one processor cause the computing device to perform a method for performing blind adaptive beamforming on narrowband signals using an uncalibrated antenna array, the method comprising:

receiving data associated with incoming signals at an M-element antenna array, wherein the incoming signals include the signal of interest and one or more interfering signals;

estimating a beamformer based on the data associated with the incoming signals using a machine-learning model that has been trained for M antenna elements using a signal of a same type as the signal of interest; and performing beamforming on the incoming signals using the machine learning model for:

filtering the signal of interest in the time domain and the frequency domain from the one or more interfering signals via at least one convolution filter per antenna element; and spatially mitigating the one or more interfering signals from the filtered signal of interest, wherein:

the beamformer does not require a calibrated RF front-end; and the beamformer does not require information about direction of arrival (DOA) of the signal of interest.

\* \* \* \* \*